No. 809,550. PATENTED JAN. 9, 1906.
H. BLUMENBERG, Jr.
PROCESS OF MAKING BORIC ACID, &c.
APPLICATION FILED MAR. 24, 1905.
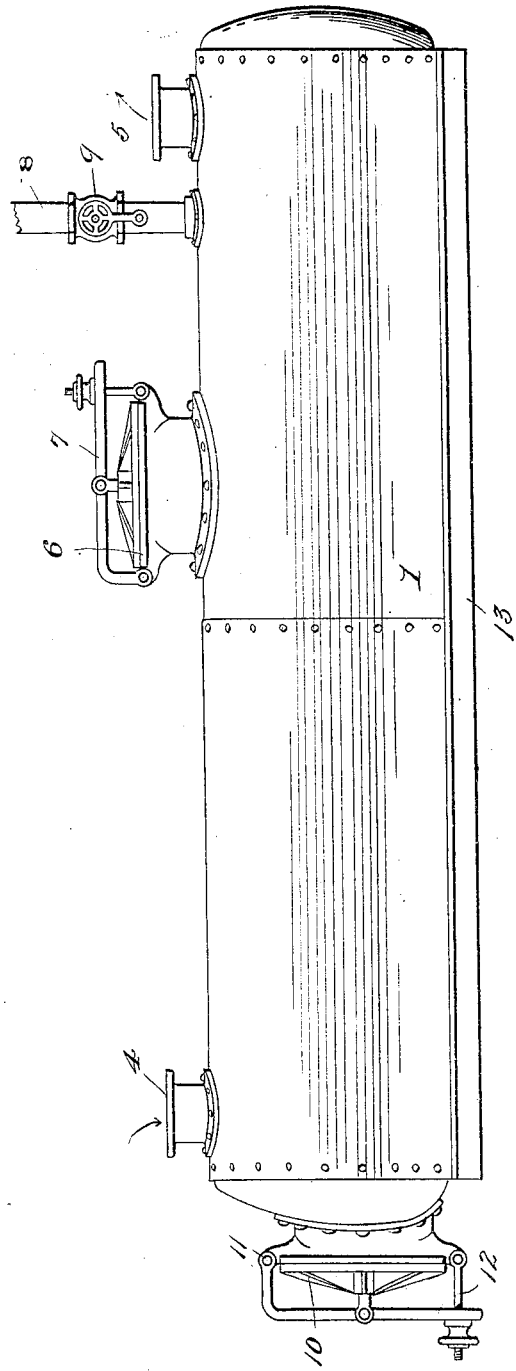

UNITED STATES PATENT OFFICE.

HENRY BLUMENBERG, JR., OF DAGGETT, CALIFORNIA, ASSIGNOR TO AMERICAN BORAX COMPANY, OF PITTSBURG, PENNSYLVANIA, A CORPORATION OF CALIFORNIA.

PROCESS OF MAKING BORIC ACID, &c.

No. 809,550.     Specification of Letters Patent.     Patented Jan. 9, 1906.

Application filed March 24, 1905. Serial No. 251,907.

*To all whom it may concern:*

Be it known that I, HENRY BLUMENBERG, Jr., of Daggett, in the county of San Bernardino and State of California, have invented certain new and useful Improvements in Processes for the Reduction of Borosilicates of Lime, Borate of Lime, or Combinations Having Alkali-Earth Metals as a Base; and I do hereby declare the following to be a full and clear description thereof.

My invention relates to processes for the reduction of borosilicates of lime, borate of lime, or combinations having alkali-earth metals as a base on a commercial scale.

The accompanying drawing illustrates an exemplification of apparatus in connection with which my process may be employed.

Ore of the character above described is contained in a suitable vessel and is there brought into contact with the fumes of burning sulfur or sulfur dioxid. I provide a generator 1 for producing the sulfur dioxid, preferably having a flat bottom (for reasons hereinafter specified) and provided with a trap 6 for the introduction of the sulfur. This trap is provided with a suitable closure and means 7 for quickly securing and releasing said closure when it is desired to introduce a supply of sulfur. An air-inlet pipe 4 is provided leading into the generator for supplying air to the interior under pressure. A discharge-pipe 5 is provided leading from the generator to the ore-reducing vessel (not shown) for carrying the sulfur-dioxid gas to the latter. An auxiliary discharge-pipe 8 is also fitted leading out of the apartment in which the generator is located, and a suitable valve 9 in this pipe provides means for "blowing off" a portion of the gaseous contents of the generator when it is desired to introduce a new charge. The process is continued in operation as follows: Sulfur being in combustion in the generator, the valve in the auxiliary discharge-pipe is opened briefly, relieving the generator of a portion of its fumes. The quick-opening trap is then opened and a fresh charge of sulfur thrown in, there being little emission of the fumes, because of the rapidity with which the trap can be opened and closed and because of the relief in pressure provided by the exhaust-valve referred to. The new charge as soon as it partially ignites and melts spreads out on the flat floor of the generator, burning very freely and giving a copious supply of the gas. Air is meanwhile being continually injected into the generator under pressure through the air-supply pipe, and the product is being discharged through the normal discharge-pipe into the reducing vessel. If desired, connection may be made in any suitable manner between the quick-opening trap and the relief-valve, so that the two may be simultaneously opened. The sulfur dioxid so produced is conducted to a suitable vessel containing the ore, which has been ground to a suitable fineness and is mixed with water in proportions varying according to the properties of the ore, and is allowed to come in contact with the ore, preferably by introduction into the vessel near its bottom. The ore is decomposed by the action of the gas, separating out the product boric acid, which is taken up as a solution by the water and may be drawn off and precipitated by evaporation.

I claim all variations in the above-described process not departing essentially from the spirit of my invention as well as the following:

The process of producing boric acid, borax, or the like, consisting in generating sulfur dioxid continuously by burning sulfur in a vessel, supplying said vessel continuously with air under pressure, introducing sulfur into the vessel without interrupting the process, temporarily diverting a portion of the sulfur dioxid to the outside atmosphere during the introduction of the sulfur, leading the sulfur-dioxid gas into the presence of ore of the character described, which is finely divided and mixed with water in suitable proportions, resulting in decomposing the ore and freeing boric acid or the like, which is taken up by the water in solution, and separating the product by evaporation.

In testimony whereof I have affixed my signature in the presence of two witnesses.

HENRY BLUMENBERG, JR.

Witnesses:
   CLARENCE HORAN,
   HARVEY WOOLEY.